May 16, 1944.  J. L. RAY  2,348,754
TURBINE APPARATUS
Filed Aug. 6, 1942
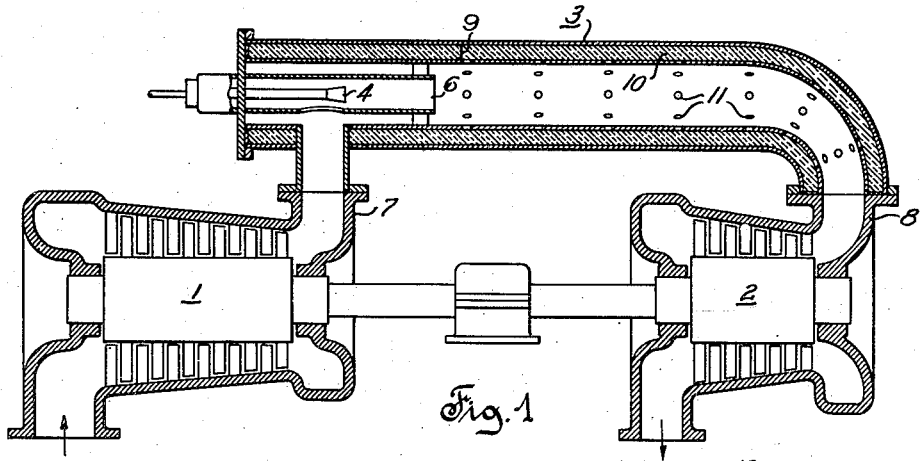
Fig. 1
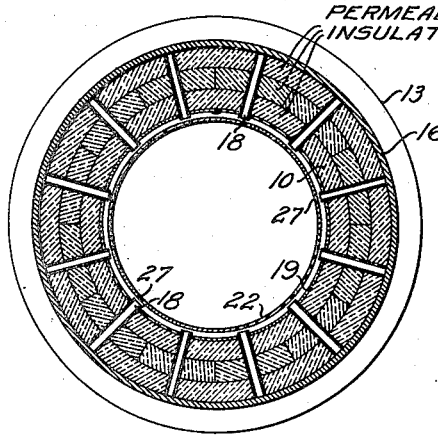
PERMEABLE INSULATION
Fig. 3
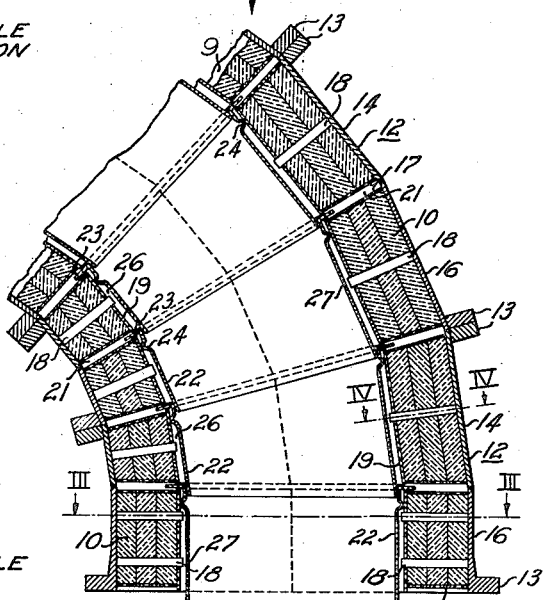
Fig. 2
Fig. 4
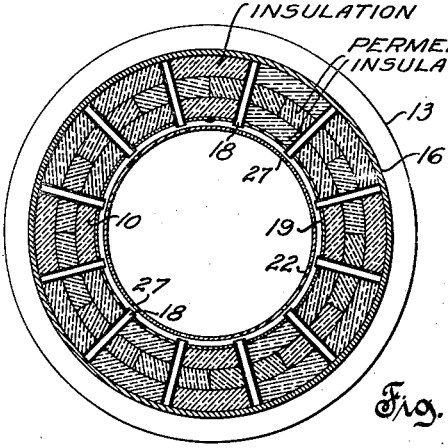
NON-PERMEABLE INSULATION
PERMEABLE INSULATION
Fig. 5
Inventor
J. L. Ray
by K. H. Wyman
Attorney Patented May 16, 1944

2,348,754

UNITED STATES PATENT OFFICE 2,348,754

TURBINE APPARATUS

James L. Ray, Elm Grove, Wis., assignor to Allis-Chalmers Manufacturing Company, Milwaukee, Wis., a corporation of Delaware Application August 6, 1942, Serial No. 453,823

15 Claims. (Cl. 138—64)

This invention relates generally to elastic fluid turbine apparatus and more particularly to the construction of insulated high temperature fluid confining structures capable of safely withstanding large variations in temperature and/or pressure of the confined fluid.

The invention is particularly applicable, although in no manner limited, to combustion turbine systems and, in this connection, it has heretofore been common practice to jacket the combustion chamber, the nozzle structure and the interconnecting conduit, thereby providing a closed chamber or space surrounding the motive fluid confining wall and (1) to flow a suitable cooling fluid through said space under conditions operative to maintain the pressure within the said space substantially equal to the pressure of the confined motive fluid, or (2) to fill said space with a permeable insulating material and provide an external fluid admission connection and a source of fluid under pressure for maintaining the pressure within said space substantially equal to that of the motive fluid, or (3) to fill said space with any suitable insulating material, or (4) to utilize dead air within said space as the insulating medium.

These known practices are not entirely satisfactory since with respect to (1) the additional apparatus necessary for suitably regulating the pressure of the cooling fluid and the power consumed in pumping same materially increases the initial and operating costs; since with respect to (2) a plurality of, rather than one, pressure producing connections are necessary if the pressure within the insulation filled space is to change as rapidly and to the same extent as the variations in the pressure of the motive fluid produced by sudden changes in speed and/or temperature which complicates the construction and materially increases the initial cost; and since with respect to (3) and (4) the pressure within the insulation filled or dead air space will not be maintained substantially equal to the pressure of the motive fluid and as a result the separating wall when highly heated may rupture or collapse.

It is therefore the primary object of this invention to provide an improved high-temperature fluid confining structure which can be readily and adequately insulated to reduce heat transfer therethrough to a minimum and which is at all times effective to equalize the pressure on opposite sides of the fluid confining wall thereof.

In accordance with this invention, the aforementioned improved construction comprises spaced walls defining therebetween a closed space surrounding the fluid confining wall, a permeable insulating material disposed in said space, and one or more openings in the walls separating the insulating material from the confined fluid, thereby effectively equalizing the pressure on opposite sides of the separating wall. In this connection, it may be desirable depending in part upon the distance between said walls and the nature of the insulating material available to employ an inner layer of permeable insulating material and an outer layer of non-permeable insulating material.

The inner or separating wall becomes highly heated and expands both longitudinally and radially with respect to the outer wall, which is kept relatively cool by the low rate of heat transfer through the interposed insulation and by the convection cooling of its exposed outer surface, and the occurrence of such relative expansion in the constructions heretofore employed stresses the intensely heated inner wall sufficiently to render failure of same highly probable. Consequently, another object of this invention is to provide an improved insulated, high-temperature fluid confining structure in which the inner wall is mounted for relative movement or expansion both longitudinally and radially with respect to the outer wall portion thereof, thereby entirely eliminating the excessive stresses produced by a relative expansion of parts in the prior art structures.

A further object of this invention is to provide an improved, durable, high-temperature fluid confining structure which effectively eliminates the excessive stresses produced by a relative expansion of cool and hot parts, which effectively minimizes heat transfer and pressure differences on opposite sides of the fluid confining wall, and which can be readily manufactured and installed with a minimum of time and expense.

The invention accordingly consists of the various details of construction, combinations of elements and arrangements of parts as more fully set forth in the detailed description, reference being had to the accompanying drawing, in which:

Fig. 1 illustrates a combustion turbine system embodying the invention;

Fig. 2 is a longitudinal section through a portion of a fluid confining conduit illustrating in detail a practical construction embodying the invention;

Fig. 3 is a transverse section taken on line III—III of Fig. 2;

Fig. 4 is an enlarged partial section taken on line IV—IV of Fig. 2; and

Fig. 5 is a view similar to Fig. 3 illustrating a modified construction.

Referring to Fig. 1, it is seen that a combustion turbine system embodying the invention may include an axial compressor 1, an axial flow gas turbine 2, and a jacketed gaseous motive fluid generating and conducting structure 3 having in one end thereof a conventional fluid fuel burner 4 disposed within a coaxial mixing tube 6. The burner end of the structure 3 is connected with the discharge 7 of the compressor 1 and the discharge end of said structure is connected with the inlet 8 of the turbine 2, whereby the compressor delivers air into the combustion chamber and the resulting mixture of excess air and combustion gases, which constitutes the motive fluid, passes into the turbine and drives same. A portion of the power developed by the turbine is utilized in driving the compressor and the remainder or excess power may be used for driving an electric generator or other external power consuming means (not shown). Operation of such a system is generally initiated by coupling the turbine and compressor with a suitable prime mover, such as an internal combustion engine or an electric motor (not shown), which is capable of bringing the compressor and turbine unit up to a speed sufficient for self-operation. The combustion turbine system hereinbefore described is conventional in all material respects, and a further description in this connection is unnecessary for a complete understanding of the invention.

The inner wall of the jacketed structure 3 and particularly that portion between the end of the mixing tube 6 and the turbine inlet 8 is normally heated sufficiently during operation of the system to render said wall incapable of withstanding appreciable variations in the pressures acting upon opposite sides thereof. The pressure of the motive fluid confined by said inner wall fluctuates considerably in response to changes in temperature and/or load, thereby producing differential pressures effective to rupture or collapse said wall when highly heated and in order to eliminate any possibility of such a failure, the space between the inner and outer walls of said jacketed structure is filled with permeable insulation 10 and the inner walls are provided with a sufficient number of perforations 11 to afford a breathing action, i. e., a flow of motive fluid into and out of said space through said perforations as the pressure of the motive fluid increases and decreases, respectively, which is effective at all times to maintain the pressure within said space substantially equal to the pressure of the confined motive fluid. The radial thickness of the permeable insulation surrounding the inner wall must be sufficient to reduce the rate of heat transfer therethrough to the outer wall to a value commensurate with the rate at which the exposed surface of the outer wall is cooled by convection and radiation. The radial thickness of the permeable insulation which is necessary in order to maintain the temperature of the outer wall within safe limits is dependent upon the temperature of the confined motive fluid, the permeability and heat conductivity of the insulating material employed, and the rate at which the outer wall is cooled, and knowing these factors, anyone skilled in the art can readily determine the requisite thickness. For purposes of illustration in this connection, a combustion turbine system embodying a 26" inside diameter conduit which has no special means provided for cooling the outer wall and which conducts motive fluid at a temperature of 1500° F. to the turbine inlet, requires a surrounding layer of "Superex" insulation having a radial thickness of at least 9" in order to maintain the temperature of the outer wall within safe limits.

The perforations 11 should be made relatively small and/or should be shielded by any suitable means (not shown) in order to prevent particles of the insulation from being drawn into the stream of motive fluid passing into the turbine. The construction illustrated schematically in Fig. 1 is suitable for use in installations in which the velocity and the temperature of the motive fluid are sufficiently low to render (a) the use of screened or shielded perforations effective to retain all of the insulation within the space 9 and (b) the inner wall capable of withstanding the stresses set up therein by its expansion and contraction, both longitudinally and radially, relative to the outer surrounding wall. In this connection, it has been found that in installations utilizing a high temperature motive fluid, i. e., a fluid having a temperature approaching or in excess of 900° F., and a construction effective to maintain a large temperature differential between the inner and outer walls of the jacketed structure, the stresses set up in the inner wall by its expansion and contraction relative to the outer wall are usually sufficient to cause the inner wall to fail even though the pressures of the fluids acting upon opposite sides of said wall are maintained substantially equal at all times. Consequently, in high temperature installations, the jacketed structure 3 of Fig. 1 may be considered as embodying, in whole or in part, an inner wall construction similar to that shown in Figs. 2–5 inclusive which provides the hereinbefore described breathing action and which, in addition, is mounted for relative expansion both longitudinally and radially with respect to the outer wall thereof.

Referring particularly to Figs. 2, 3 and 4, it is seen that the outer wall is formed by a plurality of annular portions 12 presenting flanged ends 13 which are removably secured together by any suitable means such as bolts (not shown) and which in the case of a curved section of pipe are preferably formed by abutting and welding together the abutting non-flanged ends of a pair of straight sections 14 and 16 as shown; that the inner surface of each section 14 and 16 has welded or otherwise secured thereto (a) an inwardly projecting perforated annular disk 17 adjacent each end and (b) at least one series of circumferentially spaced inwardly projecting perforated tubes 18 which are disposed between said disks; that the annular spaces formed by the inner surfaces of the sections 14 and 16 and the opposed surfaces of the pair of disks 17 on each of said sections are filled with permeable and preferably preformed bricks or slabs of insulation 10 through which the tubes 18 project; that the insulation filled spaces formed by said sections and disks are closed by perforated annular metal sheets 19 which may be welded to the inner edges and ends of the disks 17 and tubes 18 as shown and which may be split to facilitate assembly and then welded together when in place as indicated in Fig. 3; that the disks 17 adjacent the abutting ends of the sections 14 and 16 are spaced apart longitudinally to provide therebetween an annular separating space 21; that the inner fluid confining wall or lining is formed by a plurality of straight annular sections 22 each having a flanged end 23 adapted to extend loosely within the space 21, a circumferential bead 24 on its outer surface adjacent said end which is adapted to engage the inner surface of the opposed sheet 19, thereby providing an annular space 26 between each sheet 19 and the opposed section 22, and perforations 27 (see Fig. 3) arranged for approximate alinement with the adjacent ends of tubes 18; and that the length of each section 22 is greater than the length of the sections 14 and 16, thereby necessitating mounting the sections 22 in the overlapping relation shown in Fig. 2.

Perforating the disks 17 and the sheets 19, which are preferably made from thin sheets of stainless steel, serves four purposes, (1) it permits motive fluid entering the spaces 21 and 26 to pass into the permeable insulation 10 (motive fluid enters the space 21 through the non-sealed, overlapping sliding connection provided between the flanged and plain ends of adjacent sections 22), (2) it renders the disks 17 readily flexible in a longitudinal direction, thereby permitting the sheets 19, which are secured to their inner ends and which become extremely hot, relatively free to expand longitudinally in either direction from the tubes 18 constituting anchor points for the sheets 19, (3) it renders the ends of the sheets 19 readily flexible in a radial direction, thereby permitting the disks 17, which have their inner edges secured to the opposite ends of the sheets 19 and which also become highly heated, to be relatively free to expand radially inward with respect to the outer wall sections to which the outer edges are anchored, and (4) it materially decreases their effective cross sectional heat conducting area, thereby reducing the quantity of heat transmitted to the outer wall sections (this result and that specified in (1) above are also obtained by perforating the tubes 18). Positioning and supporting the lining sections 22 in the overlapping relation previously described renders these highly heated portions free to expand both longitudinally and radially with respect to each other, with respect to the sheets 19 and disks 17 and with respect to the outer wall sections 14 and 16; said radial expansion being permitted by the flanged end extending loosely within the annular space 21 and by the flexibility of the sheets 19 engaged by the spacing bead 24.

The construction shown in Fig. 5, in which like numerals are used to designate the same or similar parts, differs from that shown in Figs. 2, 3 and 4 only in that the insulation filling the space between the outer and inner wall or lining comprises an outer layer of non-permeable insulation and two inner layers of permeable insulation. The number of layers of non-permeable and permeable insulation employed is purely a matter of design depending upon the distance between the inner and outer walls and the nature of the insulating material employed. The structures shown in Figs. 2 and 5 can be readily constructed by assembling the various elements in the following sequence: (a) welding a disk 17 to the flanged end of a straight section 16, (b) welding the tubes 18 to the section 16, (c) placing the preformed bricks or slabs of insulation 10 over the tubes 18, (d) welding a disk 17 to the plain or non-flanged end of section 16, (e) placing the split sheet 19 over the tubes 18 and welding same to the ends of said tubes and to the inner edges of the disks 17 (the split edges of the sheet may also be welded together if desired), and (f) inserting a section 22 from the non-flanged end of section 16, said section being held in place by its flange 23 engaging the upper edge and its bead 24 engaging the inner surface of the sheet 19. This completes the assembly of the elements carried by straight section 16 and in order to complete the assembly carried by an annular portion 12, the various elements carried by the straight section 14 thereof are assembled in the manner just described with respect to straight section 16, and the straight sections 16 and 14 are then combined to form a portion 12 by abutting and welding together their plain or non-flanged ends as shown. The above outlined sequence of assembly, which is merely illustrative of a practical procedure, can obviously be varied in some respects to suit individual requirements.

All of the constructions herein shown and described provide a breathing action which is effective at all times to substantially equalize the pressures acting upon opposite sides of the motive fluid confining wall or lining and in addition, the constructions shown in Figs. 2–5 inclusive also provide an inner wall or lining construction which is relatively free to expand and contract both longitudinally and radially with respect to the surrounding outer wall. Moreover, since the perforations in the tubes 18 and sheets 19 are made very small and since the sheets 19 and tubes 18 are in effect covered by a spaced section 22 which has only a few relatively small holes therein, there is but little if any possibility of drawing particles of insulation into the stream of motive fluid regardless of its velocity. In addition, the inner wall or lining structure shown in Figs. 2–5 inclusive effectively minimizes heat transfer therethrough to the outer surrounding wall and affords a durable and simplified construction which can be readily manufactured, installed and serviced with a minimum of time and expense.

The invention is applicable to all types of high temperature gaseous fluid generators and/or conductors and although the disclosed embodiments are shown as applied to a combustion turbine system, it should be understood that it is not intended to limit the invention in its application and construction to the exact details herein shown and described as various modifications within the scope of the appended claims may occur to persons skilled in the art.

It is claimed and desired to secure by Letters Patent:

1. A high temperature gaseous fluid confining structure capable of safely withstanding large variations in temperature and/or pressure of the confined fluid comprising a first means defining a fluid confining wall having therein one or more restricted openings therethrough, permeable insulation covering the outer surface of said fluid confining wall, and a second means defining a coacting imperforate wall surrounding said insulation.

2. A high temperature gaseous fluid confining structure capable of safely withstanding large variations in temperature and/or pressure of the confined fluid comprising a first means defining a fluid confining wall having one or more openings therethrough, permeable insulation covering the outer surface of said fluid confining wall, non-permeable insulation covering said permeable insulation, and a second means defining a coacting imperforate wall surrounding said non-permeable insulation.

3. A high temperature gaseous fluid confining structure capable of safely withstanding large variations in temperature and/or pressure of the confined fluid comprising an outer wall portion, an inner fluid confining wall portion spaced from said outer wall portion and including separable sections mounted for relative expansion both longitudinally and radially with respect to each other and with respect to said outer wall portion, permeable insulation substantially filling the space between said inner and outer wall portions, and means for equalizing the pressure on opposite sides of said inner wall portion.

4. A high temperature gaseous fluid confining structure capable of safely withstanding large variations in temperature and/or pressure of the confined fluid comprising an outer wall portion, an inner double wall portion spaced from said outer wall portion and including means defining in spaced relation a perforated insulation retaining shell and a protective fluid confining lining having openings therethrough, and permeable insulation covering the outer surface of said shell.

5. A high temperature gaseous fluid confining structure capable of safely withstanding large variations in temperature and/or pressure of the confined fluid comprising an outer wall portion, an inner fluid confining wall portion spaced from said outer wall portion and including separable annular sections mounted in overlapping relation for relative expansion both longitudinally and radially with respect to each other and with respect to said outer wall portion, permeable insulation substantially filling the space between said inner and outer wall portions, and means comprising openings through said inner wall portion for equalizing the pressure on opposite sides thereof.

6. A high temperature gaseous fluid confining structure capable of safely withstanding large variations in the temperature of the confined fluid comprising an outer wall portion, a pair of longitudinally spaced flexible annular disks secured to the inner surface of said outer wall portion, a radially flexible cover member secured to the inner edges of said disks and forming with said disks and the inner surface of said outer wall portion, an insulating compartment, and an inner fluid confining lining covering the inner surface of said cover member and being mounted for expansion and contraction both longitudinally and radially with respect to said cover member, disks and outer wall portion.

7. A high temperature gaseous fluid confining structure capable of safely withstanding large variations in the temperature and/or pressure of the confined fluid comprising an imperforate outer wall portion, a pair of longitudinally spaced flexible annular disks secured to the inner surface of said outer wall portion, a radially flexible, perforated cover secured to the inner edges of said disks and forming with said disks and the inner surface of said outer wall portion, an insulating compartment, permeable insulation disposed in said compartment, and an inner perforated fluid confining lining covering the inner surface of said cover member and being mounted for expansion both longitudinally and radially with respect to said cover member, disks and outer wall portion.

8. A high temperature gaseous fluid confining structure capable of safely withstanding large variations in the temperature of the confined fluid comprising an outer wall portion, means defining with the inner surface of said outer wall portion longitudinally spaced coaxial compartments having longitudinally flexible side walls and radially flexible inner walls, and inner fluid confining lining sections covering said flexible inner walls and being disposed in partially overlapping relation for expansion and contraction both longitudinally and radially with respect to each other and with respect to the means forming said compartments.

9. A high temperature gaseous fluid confining structure capable of safely withstanding large variations in the temperature of the confined fluid comprising an annular outer wall portion, a sectional inner wall portion spaced from said outer wall portion, and means including flexible elements interconnecting and coaxially mounting said inner wall sections within said outer wall for expansion both longitudinally and radially with respect to each other and with respect to said outer wall.

10. A high temperature gaseous fluid confining structure capable of safely withstanding large variations in the temperature of the confined fluid comprising an annular outer wall portion, an inner wall portion spaced from said outer wall portion, and means interconnecting and coaxially mounting said inner wall portion within said outer wall portion for expansion both longitudinally and radially with respect to said outer wall portion.

11. A high temperature gaseous fluid confining structure capable of safely withstanding large variations in temperature and/or pressure of the confined fluid comprising an outer wall portion, an inner fluid confining wall portion, means including flexible elements mounting said inner wall portion in spaced coaxial relation within said outer wall portion for expansion both longitudinally and radially relative to said outer wall portion, and means for equalizing the pressure on opposite sides of said inner wall portion.

12. A high temperature gaseous fluid confining structure capable of safely withstanding large variations in temperature and/or pressure of the confined fluid comprising an outer wall portion, an inner fluid confining wall portion, and means including flexible elements mounting said inner wall portion in spaced coaxial relation within said outer wall portion for expansion both longitudinally and radially relative to said outer wall portion.

13. A high temperature gaseous fluid confining structure capable of safely withstanding large variations in temperature and/or pressure of the confined fluid comprising an outer wall portion, separable inner wall forming sections, and means including flexible elements overlappingly mounting said sections in spaced coaxial relation within said outer wall portion for expansion both longitudinally and radially relative to each other and relative to said outer wall portion.

14. A high temperature gaseous fluid confining structure capable of safely withstanding large variations in temperature and/or pressure of the confined fluid comprising an outer imperforate wall, means within said outer wall defining in spaced relation thereto an inner wall having one or more restricted openings therethrough for the passage of confined fluid into and out of the space between said inner and outer walls as the pressure of the confined fluid increases and decreases, respectively, and permeable insulation substantially filling said space.

15. A high temperature gaseous fluid confining structure capable of safely withstanding large variations in temperature and/or pressure of the confined fluid comprising an outer imperforate wall, means within said outer wall defining in spaced relation thereto an inner wall having one or more restricted openings therethrough for the passage of confined fluid into and out of the space between said inner and outer walls as the pressure of the confined fluid increases and decreases, respectively, and permeable insulation covering the outer surface of said inner wall.

JAMES L. RAY.